United States Patent [19]

Peebles, III et al.

[11] Patent Number: 5,449,466
[45] Date of Patent: Sep. 12, 1995

[54] APPARATUS AND METHOD FOR PHOTOCATALYTIC TREATMENT OF A FLUID

[75] Inventors: Henry G. Peebles, III, Middleburg; Steven K. Gorman, Jacksonville; William C. Harkey, Orange Park, all of Fla.

[73] Assignee: American Energy Technologies, Inc., Green Cove Springs, Fla.

[21] Appl. No.: 371,594

[22] Filed: Jan. 12, 1995

Related U.S. Application Data

[63] Continuation of Ser. No. 52,400, Apr. 23, 1993, abandoned.

[51] Int. Cl.$^6$ ............................................. C02F 1/32
[52] U.S. Cl. ..................................... 210/747; 210/748; 210/763; 210/198.1; 210/170; 126/674
[58] Field of Search ............... 250/435, 436, 437, 438; 422/24, 186.3; 210/748, 192, 747, 170, 763, 198.1; 126/674

[56] References Cited

U.S. PATENT DOCUMENTS

| | | | |
|---|---|---|---|
| 1,145,140 | 7/1915 | Henri et al. | 422/24 |
| 1,193,143 | 8/1916 | Henri et al. | 422/24 |
| 1,266,803 | 5/1918 | Henri et al. | 422/24 |
| 1,473,095 | 11/1923 | Henri et al. | 250/437 |
| 3,485,576 | 12/1969 | McRae et al. | 422/24 |
| 3,814,680 | 6/1974 | Wood | 250/437 |
| 3,837,800 | 9/1974 | Wood | 210/764 |
| 3,964,867 | 6/1976 | Berry | 356/246 |
| 4,008,136 | 2/1977 | Williams | 210/748 |
| 4,069,153 | 1/1978 | Gunther | 210/748 |
| 4,182,406 | 1/1980 | Holbrook et al. | 165/485 |
| 4,264,421 | 4/1981 | Bard et al. | 204/157.1 |
| 4,303,486 | 12/1981 | Bard et al. | 204/162 |
| 4,365,619 | 12/1982 | Holbrook et al. | 126/428 |
| 4,438,337 | 3/1984 | Forrat | 210/748 |
| 4,471,225 | 9/1984 | Hillman | 250/437 |
| 4,621,195 | 11/1986 | Larsson | 250/436 |
| 4,676,896 | 6/1987 | Norton | 250/436 |
| 4,774,026 | 9/1988 | Kitamori et al. | 252/627 |
| 4,788,038 | 11/1988 | Matsunaga | 210/748 |
| 4,861,484 | 8/1989 | Lichtin et al. | 210/638 |
| 4,888,101 | 12/1989 | Cooper et al. | 204/157.15 |
| 4,892,712 | 1/1990 | Robertson et al. | 422/186 |
| 4,943,357 | 7/1990 | Van Antwerp et al. | 204/157.15 |
| 4,954,465 | 9/1990 | Kawashima et al. | 502/183 |
| 4,997,576 | 3/1991 | Heller et al. | 210/748 |
| 5,035,794 | 7/1991 | Anderson et al. | 204/157.5 |
| 5,045,288 | 9/1991 | Raupp et al. | 422/186.3 |
| 5,116,582 | 5/1992 | Cooper et al. | 422/186.3 |
| 5,126,111 | 6/1992 | Al-Ekabi et al. | 422/186.3 |
| 5,137,607 | 8/1992 | Anderson et al. | 204/130 |
| 5,174,877 | 12/1992 | Cooper et al. | 204/193 |
| 5,182,030 | 1/1993 | Crittenden et al. | 210/748 |
| 5,184,020 | 2/1993 | Hearst et al. | 250/454.11 |
| 5,227,140 | 7/1993 | Hager et al. | 422/186.3 |
| 5,246,737 | 9/1993 | Murador | 427/307 |

FOREIGN PATENT DOCUMENTS

| | | | |
|---|---|---|---|
| 7074 | 7/1987 | Australia | 210/763 |
| 0306301 | 3/1989 | European Pat. Off. . | |
| 0401884 | 12/1990 | European Pat. Off. . | |
| 3042793 | 2/1988 | Japan | 422/24 |
| 91/04094 | 4/1991 | WIPO . | |
| 91/09823 | 7/1991 | WIPO . | |

OTHER PUBLICATIONS

"Extrusion Resins", publication No. PL-1564E, Rohm & Haas, Jun. 1988.
"Plexiglass Acrylic Sheet", publication No. PLA-22a, Rohm & Haas, Feb. 1992.
Zhang et al, "Fixed Bed Photocatalyst for Solar Decontamination of Water", *Enviromental Science & Technology*, Mar. 1994.
Perry, Robert H., *Perry's Chemical Engineers Handbook*, 6th Ed. McGraw-Hill, Inc., New York, NY (1984) pp. 5-6.

*Primary Examiner*—Cynthia L. Nessler
*Attorney, Agent, or Firm*—Foley & Lardner

[57] ABSTRACT

An apparatus is disclosed for the photocatalytic treatment of a fluid, including inlet means for supplying fluid to the apparatus; exposing means for exposing the fluid to ultraviolet light; and outlet means for discharging the fluid from the apparatus connected to the exposing means. The exposing means include at least one channel defining a fluid flow path connected to the inlet means, wherein the channel is composed at least in part of an ultraviolet-transmitting, chemically inert material, is self-supporting and is capable of being pressurized.

15 Claims, 7 Drawing Sheets

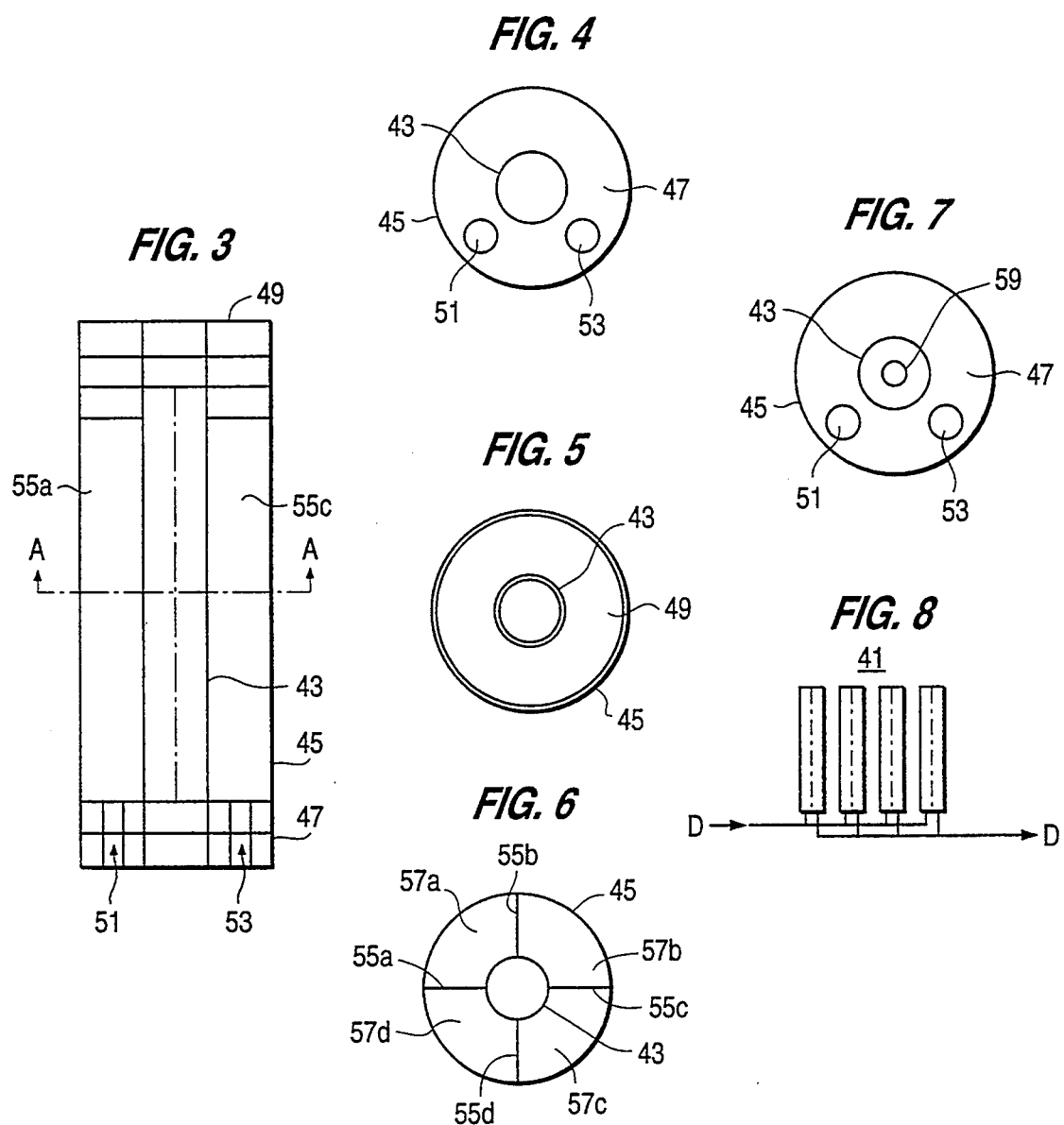

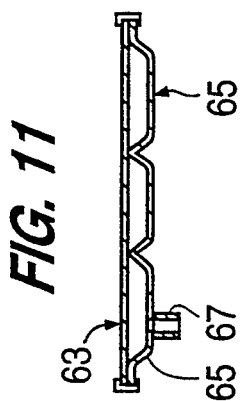
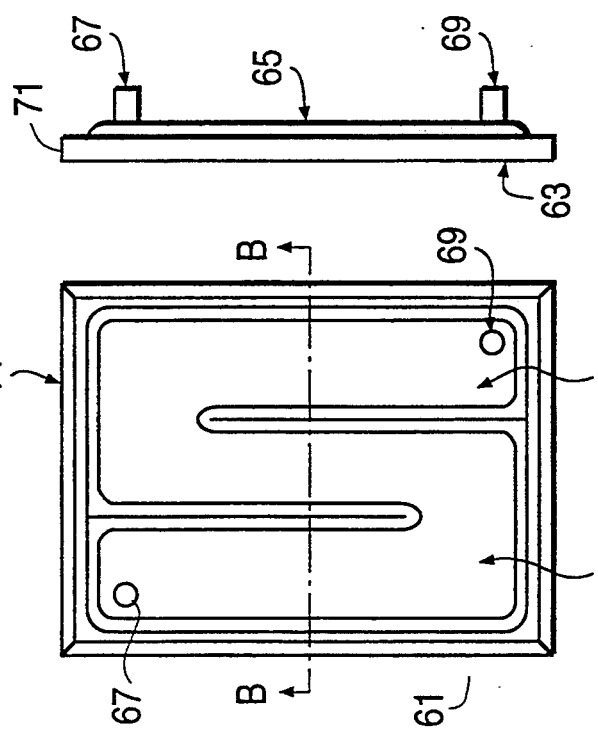

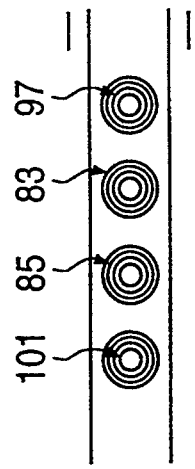
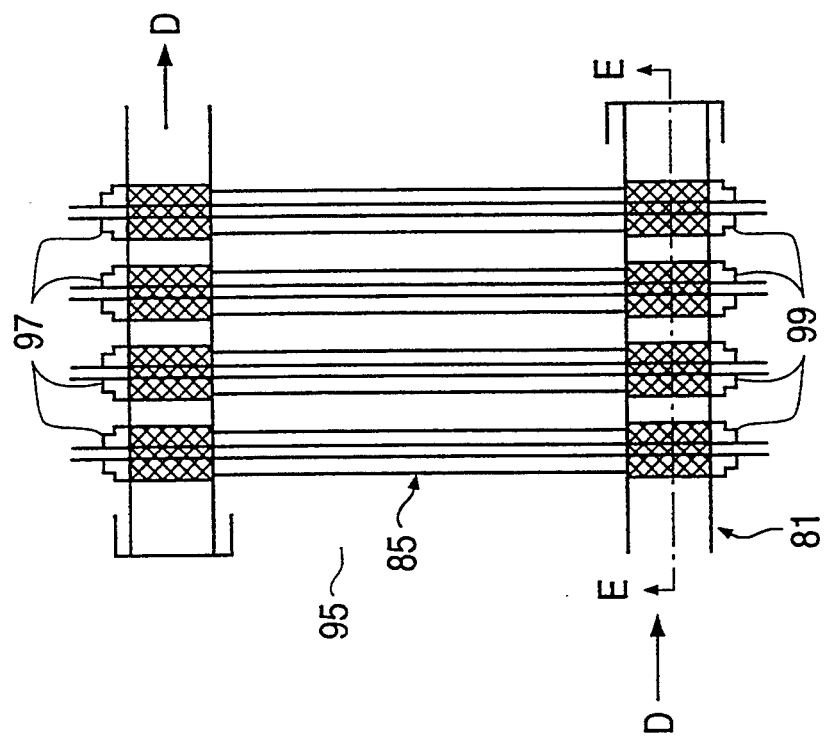

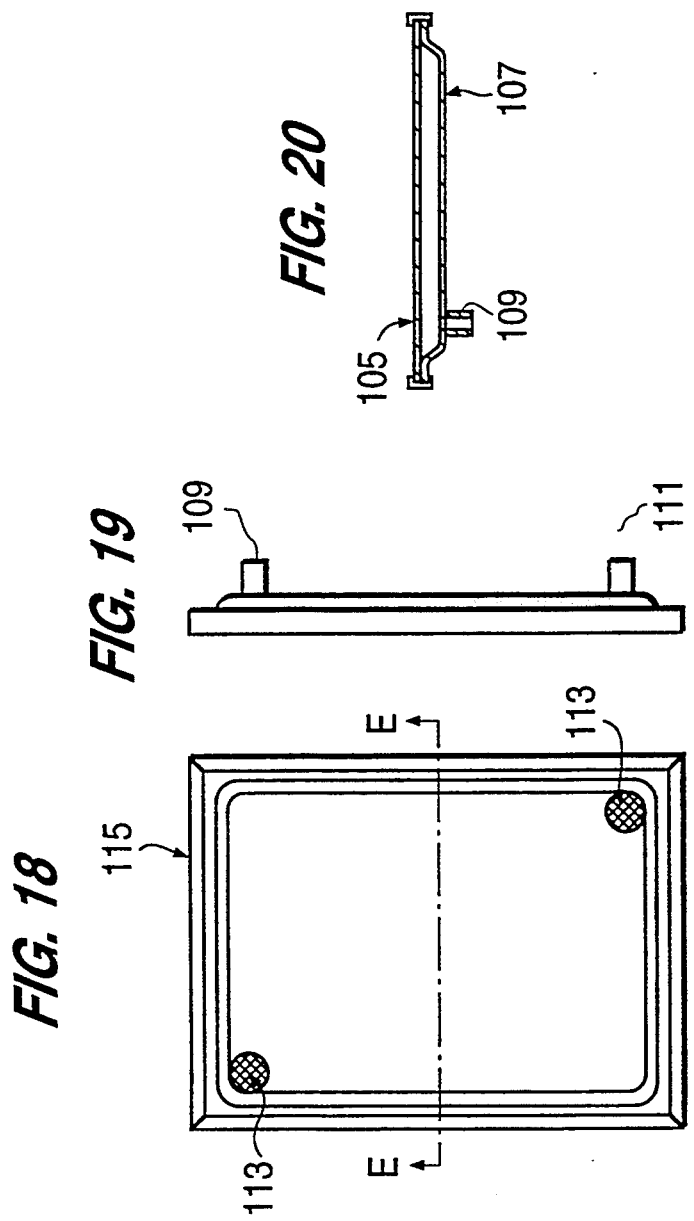

APPARATUS AND METHOD FOR PHOTOCATALYTIC TREATMENT OF A FLUID

This application is a continuation of application Ser. No. 08/052,400, filed Apr. 23, 1993 now abandoned.

BACKGROUND OF THE INVENTION

The present invention relates to an apparatus for the photocatalytic treatment of a fluid, and to a method for treating a fluid using such an apparatus.

Photochemical reactions which can be carried out in an apparatus which exposes a fluid containing one or more contaminants to high-energy radiation are known. Such reactions include photocatalytic mineralization of toxic chemicals in water and photocatalytic oxidation of metals in water, and typically involve the use of a powdered photocatalyst, which can be a semiconductor material such as $TiO_2$. These reactions are described, for example, in U.S. Pat. Nos. 4,264,421; 4,303,486; 4,774,026; 4,861,484; 4,888,101; 4,892,712; 4,943,357; 4,954,465; 4,997,576; 5,035,784; 5,045,288; 5,137,607; and 5,182,030; European Published Application No. EP 0 306 301 A1; European Application No. 90201172.5; and PCT Applications No. WO 91/09823 and WO 91/04094, the contents of each of which are incorporated in their entireties by reference.

It is known to conduct photocatalytic reactions in small-scale laboratory vessels, and in reactors such as conventional "pot" reactors wherein a source of ultraviolet radiation, such as a lamp, illuminates a reaction mixture comprising a contaminated fluid and a catalyst system within a stirred-tank reactor. Other types of apparatus for carrying out such reactions are known, for example, from U.S. Pat. Nos. 5,137,607; 5,035,784; and 4,888,101.

Certain known types of reactors include dedicated means for exposing a photocatalyst and fluid flowing therein to ultraviolet radiation. Such means can include, for example, one or more lengths of piping that are transmissive in at least some sections to ultraviolet radiation. The fluid can contain suspended therein the photocatalyst (usually in finely powdered form, having a particle diameter on the order of 20–300 $\mu m$). In an alternative, the exposing means can contain therein a granular material having a coating which includes the photocatalyst. That is, the exposing means can have a "packed bed" configuration.

However, the known photocatalytic reactors have proven impractical for the treatment of contaminated fluids on an industrial scale and/or in an outdoor environment. In particular, known ultraviolet-transmitting materials have drawbacks which preclude their effective commercial use in photocatalytic reactors. For example, borosilicate glass lacks adequate impact resistance and shear resistance. Thus, photocatalytic reactors employing borosilicate glass are easily damaged by adverse environmental conditions, such as hailstorms. Quartz is very expensive and thus not commercially practical. Fluorinated hydrocarbon plastics, such as those available under the tradenames Kynar and Teflon, are ultraviolet-transmissive if they are of low thickness, but in such form they are not self-supporting or capable of withstanding pressurization. On the other hand, when these plastics have sufficient thickness to be self-supporting and pressurizable, they lack the requisite ultraviolet transmissivity.

Thus it becomes important to provide an apparatus which enables the photocatalytic treatment of a fluid to be carried out easily and effectively. It likewise becomes important to provide a method of treating a fluid using such an improved apparatus.

SUMMARY OF THE INVENTION

In accordance with one aspect of the present invention, there is provided an apparatus for the photocatalytic treatment of a fluid. The apparatus includes inlet means for supplying fluid to the apparatus. Connected to the inlet means is exposing means for exposing the fluid to ultraviolet light. Such exposing means include at least one channel which defines a fluid flow path. The channel is comprised at least in part of an ultraviolet. transmitting, chemically inert, impact- and shear-resistant material which is self-supporting and is capable of being pressurized. The exposing means is in turn connected to outlet means for discharging the treated fluid from the apparatus.

Preferably, the ultraviolet-transmitting material employed in the inventive apparatus transmits ultraviolet radiation having a wavelength of about 295 to about 420 nm and has an ultraviolet transmittance of at least about 80%. Very preferably, the material is a low-iron tempered glass or an impact-modified acrylic. The latter materials are particularly preferred.

In more specific aspects, the inventive apparatus can be adapted to maintain fluid flow conditions within the apparatus, particularly within the exposing means, which are either turbulent or laminar. Turbulent fluid flow is desirably maintained when a powdered catalyst is to be suspended within the fluid to be treated. Turbulent flow conditions help to maintain the powdered catalyst in suspension within the fluid.

Thus, in a more specific aspect directed to a turbulent flow application, the exposing means of the apparatus includes a plurality of channels which define a plurality of fluid flow paths between the inlet and outlet means. In one such embodiment, the exposing means includes a plurality of risers which are connected in parallel between plural (typically two) headers. The parallel risers thus help define the plurality of fluid flow paths. The risers are comprised at least in part of the selected ultraviolet-transmitting material, such that the fluid flowing through the risers is exposed while flowing therein to ultraviolet light. Fluid flow is maintained in a turbulent state by the use of a plurality of baffles disposed within the headers. The baffles serve to direct the flowing fluid back and forth through the risers and between the plural headers.

In another more specific embodiment adapted. for turbulent flow operation, the exposing means of the apparatus includes an inner wall, which defines a longitudinal axis and which can have a circular, square or other desired cross-section perpendicular to its longitudinal axis. The inner wall separates an interior from an exterior, and has first and second ends. An outer wall having first and second ends surrounds the inner wall and is substantially coaxial with the inner wall. First and second end caps connect the respective first and second ends of the inner and outer walls. The first end cap has defined therethrough a fluid inlet opening and a fluid outlet opening, while the second end cap has no openings through which fluid flows. A plurality of dividers are disposed between the inner and outer walls, such that the fluid inlet and outlet openings are not both disposed between the same two dividers. These dividers define a plurality of fluid flow segments, and, together with the inner wall, outer wall and end caps, combine to define a single continuous fluid flow path between the fluid inlet opening and the fluid outlet opening. The direction of fluid flow reverses at either end of each fluid flow segment defined by the dividers, thus helping to maintain turbulent flow conditions. In this embodiment, the inner wall, outer wall and dividers are comprised of the selected ultraviolet transmitting material. The fluid thus can be exposed to ultraviolet light through both the outer and inner walls. The latter exposure is effected by use of ultraviolet illumination means, such as a fluorescent lamp disposed within the inner wall of the exposing means.

In another embodiment adapted for turbulent flow applications, the exposing means includes two elements. The two elements can be permanently joined together, or secured together by means of a removable frame, desirably a frame surrounding the edges of both elements, such that the elements can be separated by removal of the frame. The first ("top") element can be flat or formed, and the second ("bottom") element has defined therethrough a fluid inlet opening and a fluid outlet opening connected to the fluid inlet and outlet means of the apparatus. The second element is formed to define a continuous fluid flow path between the fluid inlet; and outlet openings, preferably a path which changes the direction of fluid flow one or more times. At least one of the first and second elements is comprised of the selected ultraviolet-transmitting material, thus enabling the fluid flowing within to be exposed to ultraviolet light.

Embodiments of the invention in which laminar fluid flow is maintained are desirably employed, for example, when a granular material having a coating which contains a catalyst is contained within the exposing means, that is, when the exposing means functions as a packed-bed reactor. In such embodiments, the fluid flows smoothly over substantially the entire catalytic surface.

More specific embodiment directed to laminar flow applications include embodiments which are analogous to certain of the turbulent flow embodiments above. One such embodiment includes a plurality of risers connected in parallel between plural headers. In this embodiment, however, no baffles are disposed within the headers. Thus, laminar flow can be maintained over substantially the entire fluid flow paths within the exposing means.

Another similar embodiment includes a plurality of screens which extend across the interiors of the headers, surrounding the openings at which the risers join the headers. The screens preferably are comprised of a chemically inert material and have a mesh size sufficiently small to confine a granular material. This embodiment very preferably includes such a granular material, particularly preferably a material having a coating which includes a photocatalyst, disposed within the risers and confined therein by the screens. The fluid to be treated then flows through the risers and contacts the granular material, which catalyzes a desired reaction under the action of ultraviolet light.

A modification of the foregoing embodiment includes a plurality of conduits comprised of an ultraviolet-transmitting material. Each of these conduits is disposed substantially coaxially within one of the risers, and can accommodate illumination means for introducing ultraviolet radiation into the risers through the walls of the conduits. This embodiment enables ultraviolet illumination of the fluid from both the interior and the exterior of the risers.

Another embodiment of the apparatus suitable for laminar flow applications includes a first. element which is substantially flat, and a second element which is formed and has defined therethrough a fluid inlet opening and a fluid outlet opening connected to the fluid inlet and outlet means, respectively. Like the analogous embodiment adapted for turbulent flow applications, at least one of the first and second elements of this embodiment are comprised of the selected ultraviolet-transmitting material. Unlike the analogous embodiment, however, neither of the elements are formed such that a fluid flow channel capable of maintaining turbulent flow conditions is defined. Rather, the two elements join together to form an unpartitioned void space, suitable for holding a packed bed of a granular material, preferably including a photocatalytic coating layer. Screens are affixed to the second element covering the fluid inlet and outlet openings, capable of preventing loss of granular material. A removable frame securingly disposed about the perimeter of the first and second elements joins the two elements and allows them to be separated, so that a granular material can be added or removed.

In accordance with another aspect of the present invention there is provided a method for the photocatalytic treatment of a fluid. In the method, fluid to be treated is supplied to an apparatus as described above. The fluid enters the apparatus through the fluid inlet means, and enters the exposing means. Within the exposing means, the fluid is exposed to ultraviolet light in the presence of a photocatalyst, and a photocatalytic reaction occurs which degrades at least one contaminant within the fluid to be treated. Subsequently, the fluid is discharged from the apparatus through the outlet means.

In operation, a fluid containing at least one contaminant is treated using an apparatus within the invention as follows. The fluid stream is first pretreated to remove, e.g., dirt, foreign objects, metals and metal particles, etc. If a powdered photocatalyst is to be used, it is then injected into the fluid stream; if a packed bed is to be used, no catalyst need be injected into the fluid stream. The fluid stream is next optionally pretreated by the addition of an oxidant.

The pretreated stream is then injected into an apparatus of the invention for photocatalytic treatment. Within the exposing means of the apparatus, the fluid is exposed to ultraviolet light in the presence of the particulate photocatalyst (typically under turbulent flow conditions) or a granular photocatalytic material (typically under laminar flow conditions), and at least one contaminant is degraded by the consequent photocatalytic reaction. The treated fluid flows out of the exposing means and is then discharged through the fluid outlet means of the apparatus. If a powdered photocatalyst was used, it is now removed from the fluid, e.g., by settling, filtration, etc., checked for reactivity, and recycled, or reactivated or replaced if necessary. If a granular photocatalytic material (packed bed) was used, it is checked for reactivity and regenerated if necessary, or replaced. The treated fluid is then post-treated, for example to adjust the pH of the fluid. Finally, the treated fluid is discharged from the system, for example to the environment.

The present invention thus provides a simple, practical apparatus for carrying out photocatalytic treatment of a fluid which is contaminated with heavy metals and/or organic toxic wastes. The inventive apparatus is particularly suitable for carrying out photocatalytic mineralization of toxic chemicals in water and photocatalytic oxidation of metals in water.

BRIEF DESCRIPTION OF THE DRAWING

The invention may be more readily understood by referring to the accompanying drawing in which

FIG. 3 is a side cross-sectional view of a second embodiment of exposing means adapted to maintain turbulent fluid flow showing inner and outer walls, a plurality of dividers disposed therebetween, and first and second end caps, with the walls, dividers and end caps defining a plurality of fluid flow segments which together constitute the fluid flow path;

FIG. 4 illustrates a first end cap used in the embodiment of FIG. 3, having fluid inlet and outlet openings;

FIG. 5 illustrates a second end cap used in the embodiment of FIG. 3;

FIG. 6 is a schematic cross-sectional view of the embodiment in FIG. 3 along the section depicting four dividers and the fluid flow segments defined by the dividers and the inner and outer walls;

FIG. 7 is an end view of a variant of the embodiment of FIG. 3 in which an ultraviolet light source is disposed within the inner wall;

FIG. 8 is a diagram showing multiple units of the embodiment of FIG. 3 arranged in parallel;

FIG. 9 is a top view of a third embodiment of exposing means of the invention adapted for turbulent flow, having a flat first element and a formed second element which together define a fluid flow channel which reverses the direction of fluid. flow three times;

FIG. 10 is a side view of the embodiment of FIG. 9 showing the relation of the first and second elements to a surrounding frame;

FIG. 11 is a cross-sectional view of the embodiment of FIG. 9 along the section B—B, showing the channel sections formed into the second element;

FIG. 16 is a schematic cross-sectional view of a third embodiment of exposing means suitable for laminar flow applications, similar to that shown in FIG. 13, but with the addition of ultraviolet illuminating means within each of the risers;

FIG. 17 is a cross-sectional view of a header of the embodiment of FIG. 16 along the section E—E, showing the disposition of the ultraviolet illuminating means;

FIG. 18 is a top view of a fourth embodiment of exposing means adapted for laminar flow, analogous to the turbulent flow embodiment of FIG. 9, having substantially flat first and second elements which together define a fluid flow channel throughout the entire space between the elements;

FIG. 19 is a side view of the embodiment of FIG. 19 showing the relation of the first and second elements to a surrounding frame; and FIG. 20 is a cross-sectional view of the embodiment of FIG. 9 along the section E—E, showing the volume between the elements within which a granular material can be disposed.

DETAILED DESCRIPTION OF PREFERRED EMBODIMENTS

Figure 1:
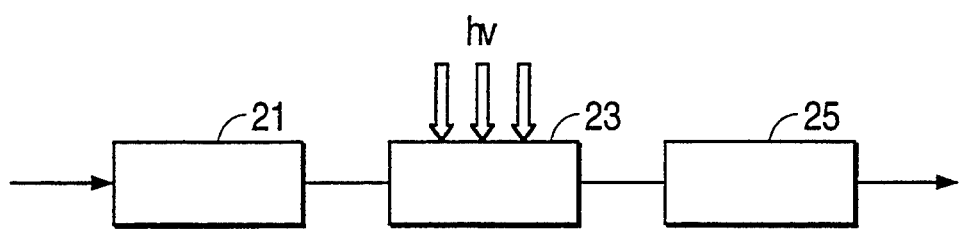
FIG. 1 is a block diagram of an apparatus according to the invention.

Referring now to the drawing, a schematic diagram of an apparatus according to the invention is shown in FIG. 1. The fluid to be photocatalytically treated is introduced into the apparatus through fluid inlet means 21. This can be any conventional means for introducing fluids into an apparatus, including a valve, a pump, an injector, etc., and selection thereof is a matter of design choice which is conventional and well-known to those skilled in the art.

From fluid inlet means 21 the fluid flows in the direction shown by the arrow into exposing means 23, which includes at least one channel defining a fluid flow path. Within the channel the fluid is exposed to ultraviolet light (hν), which can be from the sun, from an artificial source such as a fluorescent tube, or from both types of source simultaneously. Under the action of the ultraviolet light, a photocatalyst catalyzes a reaction which degrades at least one contaminant within the fluid to be treated. Typical reactions and photocatalysts are described in the patents previously mentioned.

The exposing means 23 enables the fluid to be so exposed to ultraviolet light due to the materials of which the channel through which the fluid flows is comprised. The channel is comprised at least in part, and preferably substantially or completely, of a material which is ultraviolet-transmitting. Specifically, the material must transmit at least about 80% of incident ultraviolet radiation. Preferably the material transmits about 90% or more of incident ultraviolet radiation. The prescribed transmittance is over wavelengths from about 295 to 420 nm. Fluid flow within the exposing means 23 can be either turbulent or laminar. The choice of flow regime will be determined in part by the type of photocatalytic material to be employed. If the photocatalytic material is in the form of a powdered semiconductor material such as $TiO_2$, which is usually suspended within the fluid, then turbulent flow is desirably maintained within the exposing means 23 in order to maintain the powdered catalyst in suspension, that is, to ensure an even distribution of the catalyst throughout the fluid and to prevent the catalyst from settling out of the fluid. If the photocatalytic material is a granular material (usually of much larger size than the foregoing powdered material), typically having a coating which included a photocatalyst, then laminar flow is desirably maintained within the exposing means 23. Laminar flow ensures that the fluid flows slowly and smoothly over the surface of the granular material and thus that the photocatalytic reactions occur efficiently. Turbulent flow, however, could abrade the coating layer including the photocatalyst off the granular material, and thus should be avoided.

The flow regime to be maintained within the exposing means 23 will in turn guide the selection of a particular embodiment of exposing means 23 for use in the inventive apparatus. Exemplary exposing means 23 adapted for turbulent or laminar flow are described in greater detail below.

From exposing means 23 the fluid flows through fluid outlet means 25, which, like fluid inlet means 21, can be any conventional means for discharging a fluid.

As noted above, the channel within the exposing means 23 of an apparatus according to the invention is comprised at least in part, and preferably substantially or completely, of a material having particular chemical and mechanical. properties, one of the most important of which is ultraviolet transmissivity. In addition, the selected material must be chemically inert, and must be impact-resistant, shear-resistant, self-supporting and capable of withstanding pressurization. The material or materials employed in manufacturing the channel must possess all of the foregoing properties to a suitable extent.

The material must be chemically inert, that is, it must not react with the fluids or particulate or granular materials which may be introduced into the apparatus. In this regard, the material must also be stable and not degrade under exposure to ultraviolet radiation. Specifically, the ultraviolet transmissivity of the material must not decrease by more than about 5% over a five-year period. Other chemical and physical properties must be substantially non-degraded over the same period, that is, they should not decrease to less than about 99.5% of initial value.

The ultraviolet-transmitting material must also have good mechanical properties. In particular, the material must be impact- and shear resistant. Impact strength must be at least about 0.2, as measured by the test set forth by ASTM D-256. Preferably, the impact strength is at least about 0.23 as measured by this test.

Measurement of the flexural modulus of a material provides an indication of its shear resistance. Ultraviolet-transmitting materials for use in fabricating exposing means 23 of the invention must have a flexural modulus of about 200,000 to 600,000 psi, preferably about 270,000 to 450,000 psi. Materials having a flexural modulus below about 200,000 cannot adequately support themselves for use in the inventive apparatus, while materials having a flexural modulus above about 600,000 are too brittle.

The material must in addition be self supporting, that is, capable of being manufactured in a free-standing form without the need for reinforcement. Materials having an adequate flexural modulus, as described above, typically meet this requirement.

Finally, the material must be capable of withstanding the pressure at which the inventive apparatus is operated. Preferably, the material should be capable of withstanding a pressure of about 30–100 psia. The operating pressure of the apparatus is a matter of design choice and is not to be limited to the foregoing range. However, typical operating pressures range from atmospheric pressure to 65 psia.

It is desirable in addition that the ultraviolet-transmitting material be resistant to temperature. Preferably, the material is capable of withstanding temperatures of up to about 100° C. The operating temperature of the apparatus, like the operating pressure, is a matter of design choice, and the selection of materials is not to be constrained to those materials appropriate to any particular temperature range. Typical operating temperatures range from about 4° to 38° C.

Suitable ultraviolet-transmitting materials include low-iron tempered glass, and, preferably, impact-modified resins of the acrylic family. Such resins are described in U.S. Pat. Nos. 3,751,527; 3,793,402; 3,808,180; 3,843,753; 3,895,142; 3,978,022; 4,178,406; 5,061,747; and 5,102,940, the contents of which are hereby incorporated in their entireties by reference.

Of the resins so described in the patents cited immediately above, the resins denoted hereinafter as "M-7" "M-8" and "M-9" have been found to be most preferable in practicing the instant invention. These preferred materials are commercially available under the tradename Plexiglas extrusion resins-type V920 UVT, MI-7G and DR-G, respectively. These materials have high impact resistance, chemical and thermal stability and high ultraviolet transmission, and which are readily manufactured, e.g., by known extrusion processes, molding, rolling, casting, etc. The resins are available commercially from Rohm & Haas (publication no. PL-1564E, June 1988), and are sold commercially as "Plexiglas V920 UVT" (i.e., M-7), "Plexiglas MI 7-G" (i.e., M-8), and "Plexiglas DR-G" (i.e., M-9), respectively. (The designation "-G" indicates the gamma-radiation stabilized version of the named resin). Their properties are set forth in Table 1:

TABLE 1

| Material | UV transmission | Impact Strength | Flex. Mod. (psi) |
| --- | --- | --- | --- |
| M-7 | 90% | 0.23 | 450,000 |
| M-8 | 85% | 0.6 | 350,000 |
| M-9 | 80% | 1.1 | 270,000 |

Of these materials, M-7 has the most advantageous ultraviolet transmission (app. 90%), with M-9 having a transmission of about 80%. Conversely, M-9 displays the most advantageous impact and shear resistance, with M-8 and M-7 having less resistance to impact and shear. In selecting a particular material for use in an apparatus of the invention, ultraviolet transmission and impact and shear resistance must therefore be considered together. For most applications, the M-7 resin is preferred due to its very high ultraviolet transmission. However, M-9 is preferred for embodiments having elements which must be molded, for example the embodiments shown in FIGS. 9 and 18. M-8 can be used for any application if desired.

Use of ultraviolet-transmitting materials as described above provide maximum exposure of the fluid within the inventive apparatus to ultraviolet light between about 295 nm and 420 nm. As mentioned, the requisite ultraviolet light source can be provided by the sun, either directly, through outdoor exposure of the inventive apparatus, or indirectly, through the use of non-imaging optics or non-imaging reflectors. In these two cases, the intensity of the sunlight should not exceed about 1200 W/m$^2$ on average per hour at the irradiated surface or surfaces of the apparatus. The ultraviolet light can also be provided by the sun both directly and indirectly, with the same limitations on intensity. As an alternative, ultraviolet light can be provided by artificial means, such as fluorescent light tubes or mercury vapor discharge lamps. The intensity of the ultraviolet light so provided should not exceed about 70 W/m$^2$ at the irradiated surface or surfaces. Finally, ultraviolet light can simultaneously be provided both from the sun and from an artificial. source as described above. This alternative facilitates continuous treatment of a fluid stream regardless of weather conditions. Of course, for apparatus intended for outdoor use, the artificial source of ultraviolet light should be so disposed as not to block solar ultraviolet light.

Elements utilized in an apparatus of the invention which are not intended to transmit ultraviolet radiation, but which come into contact with the fluid to be treated, are comprised of a chemically inert material or materials, and thus do not react with the fluid. Preferably, these materials are easily machinable and have good structural properties. Exemplary chemically inert materials include stainless steel, unreactive metals, metals with inert liners, fluorinated hydrocarbon plastics, chlorinated hydrocarbon plastics, and hydrocarbon plastics.

Figure 2:
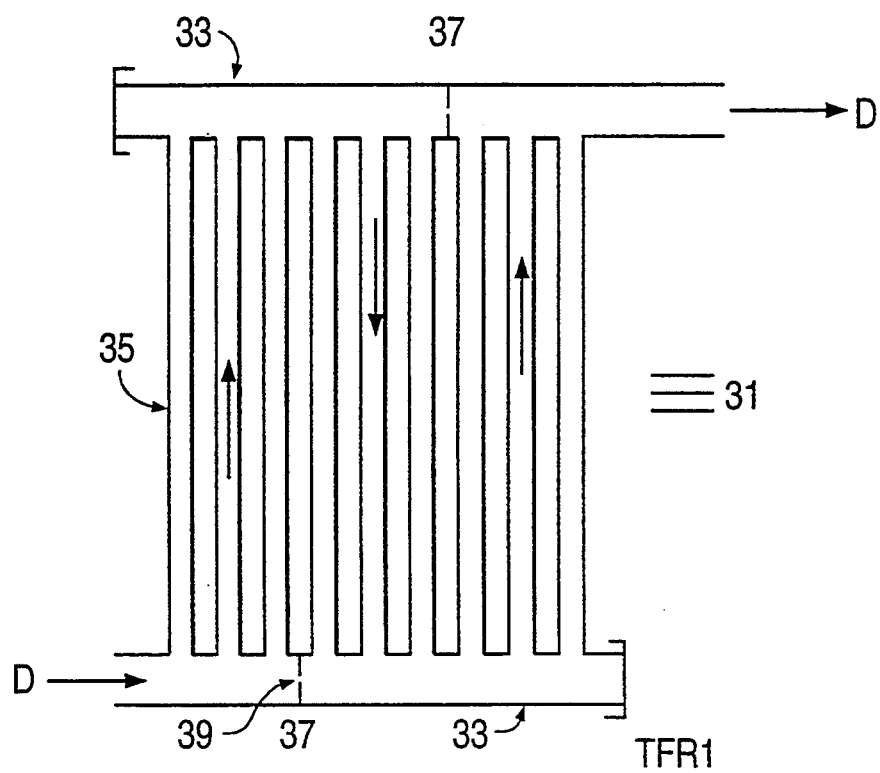
FIG. 2 is a schematic side cross-sectional view of a first embodiment of exposing means adapted to maintain turbulent fluid flow showing a plurality of risers connected in parallel between two headers, within which are disposed a plurality of baffles, with the direction of fluid flow indicated by "D"

Preferred embodiments of the exposing means 23 for use in an apparatus within the invention are shown in FIGS. 2-20. FIG. 2 shows a first embodiment of exposing means 23 wherein the fluid flow is maintained in a turbulent state throughout substantially the entire fluid flow path. Fluid inlet means 21 (not shown) join with exposing means 31 at the first of two headers 33. Connected between the headers 33 are a plurality of risers 35 disposed in parallel. Within the headers 33 are disposed a plurality of baffles 37 which serve to change the direction of fluid flow through the apparatus. Conventional fluid outlet means 25 (not shown) join with the second header 33.

The fluid flow path through the exposing means 31 is indicated by "D." As shown, the fluid flows into the first header 33 and through a first group of parallel risers 35. The fluid is then diverted by a first baffle 37 to flow in the opposite direction through a second group of risers 35, to be diverted again by another baffle 37 into a third group of risers 35. Finally, the fluid flows out the second header 33 to the fluid outlet means 25, not shown.

The headers 33 are constructed from any chemically inert material. The risers 35 are constructed at least in part from an ultraviolet-transmitting, chemically inert, impact and shear-resistant material which can be pressurized and which can maintain its shape under its own weight, as discussed above. Preferably the risers 35 are comprised substantially entirely of such an ultraviolet-transmitting material, and are formed in a manner described previously, e.g., by extrusion. Both headers 33 and risers 35 can be of any closed extended shape having any desired cross-section, for example, circular, elliptical, rectangular, etc., and can be straight or curved according to design choice. This is generally true for the similar components employed in the exemplary embodiments shown in FIGS. 12, 13 and 16 and described below.

The baffles 37 can be constructed from any of the materials of which the headers 33 and risers 35 can be comprised. They need not be ultraviolet transmitting.

The headers 33, risers 35 and baffles 37 are sized to provide a turbulent fluid flow environment along the entire flow path. The number of risers 35, and hence the number of parallel fluid flow paths making up the total fluid flow path denoted by "D" in FIG. 2 is determined based on the inner cross-sectional area of the risers 35 together with the known fluid mass transport rate. The number of parallel fluid flow paths is selected to afford a Reynolds number great enough to ensure turbulent flow within the apparatus. The headers 33 likewise are sized so that the header cross-sectional area will afford a sufficiently high Reynolds number to ensure turbulent flow with the given fluid mass transport rate.

The fluid mass transport rate and thus the exposure time are determined through routine evaluation of factors which include the total quantity of fluid to be treated, the contaminant load in the fluid, the required purity of the treated fluid at discharge, geographical constraints such as the mean hours and intensity of sunlight in a given area, etc. Typically, a sample of the fluid to be treated is obtained, for example from a toxic waste site, and analyzed in a laboratory to determine how much ultraviolet exposure is necessary in order to degrade one or more contaminants therein to an acceptable level. The fluid flow path is then designed such that the fluid residence time within the exposing means is sufficient to permit the required ultraviolet exposure. In areas having insufficient sunlight, supplemental artificial sources of ultraviolet light can be provided.

The baffles 37, as previously indicated, are secured within the headers 33 to block and divert fluid flow. Preferably the baffles 37 in both headers 33 are disposed in a staggered relationship, as shown in FIG. 2. The baffles 37 preferably each possess a small hole 39 through them, the hole 39 being sized to allow flow through them at a very slow rate. The baffle holes 39 provide for complete removal of substantially all of the fluid from the apparatus without movement of the apparatus. This ensures that fluid does not accumulate in "water traps" within the exposing means and cause damage to the apparatus, e.g., in the event that the fluid freezes.

FIGS. 3-6 show a second exposing means 41 within the invention in which turbulent fluid flow is maintained. Exposing means 41 includes an inner wall 43 which defines a longitudinal axis and which has a selected cross-section perpendicular to its longitudinal axis. Outer wall 45 is disposed coaxially about the inner wall. First end cap 47 and second end cap 49 are sealingly disposed at either end of inner wall 43 and outer wall 45 to enclose the volume defined between inner wall 43 and outer wall 45. The first end cap 47 has defined therethrough a fluid inlet opening 51 and a fluid outlet opening 53, as shown in FIG. 4. The second end cap 49 has no openings for the flow of fluid, as shown in FIG. 5. Finally, disposed between inner wall 43 and outer wall 45 substantially parallel to the common axis of the inner wall 43 and outer wall 45 are a plurality of dividers 55a-d. The dividers 55a-d, with inner wall 43 and outer wall 45 and the end caps 47 and 49, define a plurality of voids 57a-d (shown in FIG. 6), which together constitute a continuous fluid flow path from the fluid inlet opening 51 to the fluid outlet opening 53. Voids 57a-d are sized to afford turbulent flow at a desired minimum flow rate. The dividers 55a-d are arranged such that the fluid inlet opening 51 and fluid outlet opening 53 are not both disposed between the same two dividers of dividers 55a-d. Preferably the fluid inlet opening 51 and fluid. outlet opening 53 are separated by one divider of dividers 55a-d.

The continuous fluid flow path in this embodiment is defined by selecting and disposing the dividers 55a-d such that dividers 55a and 55c do not contact first end cap 47, while dividers 55b and 55d do. Dividers 55a, 55c and 55d also contact second end cap 49, while divider 55b does not.

In operation, the fluid is introduced into the exposing means 41 via fluid inlet opening 51 in first end cap 47. The fluid passes through the length of void 57a as depicted in FIG. 6, over divider 55a and into void 57b, under divider 55b into void 57c, and over divider 55c into void 57d to exit through fluid outlet opening 53. Within the exposing means the fluid is exposed to ultraviolet light.

Inner wall 43 and outer wall 45 of this embodiment can be cylindrical, or can have another desired cross-section according to design choice. The number of dividers 55a–d is also a matter of design choice.

In a preferred embodiment shown in FIG. 7, a source of ultraviolet illumination is provided within inner wall 43, thus enabling ultraviolet exposure of the fluid from both sides. In FIG. 7, ultraviolet illumination means 59 is shown disposed within inner wall 43 substantially coaxially with inner wall 43 and outer wall 45 of exposure means 41. Exemplary ultraviolet illumination means 59 include fluorescent tubes, mercury vapor lamps, fiber optics or means for multiple reflection or refraction of ultraviolet radiation having a source external to the apparatus, such as sunlight.

As shown in FIG. 8, multiple exposing means 41 according to the embodiment shown in FIG. 3 above can be linked, in parallel, or in series (not shown).

A third turbulent flow embodiment of exposing means for use in an apparatus according to the invention is shown in FIGS. 9–11. In exposing means 61, the channel defining the fluid flow path is bounded by two elements 63 and 65, at least one of which is comprised of an ultraviolet-transmitting material as discussed above. Preferably both elements 63 and 65 are ultraviolet-transmitting, allowing for exposure of the fluid from both sides of the exposing means.

The first element 63 can be flat or formed, while the second element 65 is formed to the desired channel shape, which typically defines a convoluted channel in which the direction of fluid flow changes at least once, and preferably more than once, as shown in FIG. 9. This helps to maintain the fluid in a state of turbulence.

Second element 65 further includes nipples 67 and 69 formed integrally therewith for introduction and removal of the fluid, respectively. The continuous path between the fluid inlet and outlet at nipples 67 and 69, respectively, is sized to afford turbulent flow of the fluid at a desired minimum flow rate.

In a preferred embodiment, a structural frame 71 can be attached to first element 63 and second element 65 at a portion of the edges thereof or around the entire perimeter thereof. The frame can provide additional support to the exposing means.

In the foregoing embodiment, first element 63 can be flat, that is, unformed. In such a particular embodiment, first element 63 can be comprised of low iron tempered glass, since this material is readily manufactured in flat plates. Second element 65 can be comprised of an ultraviolet-transmitting acrylic material such as M-7, or of another easily-molded material such as polyethylene.

Figure 12:
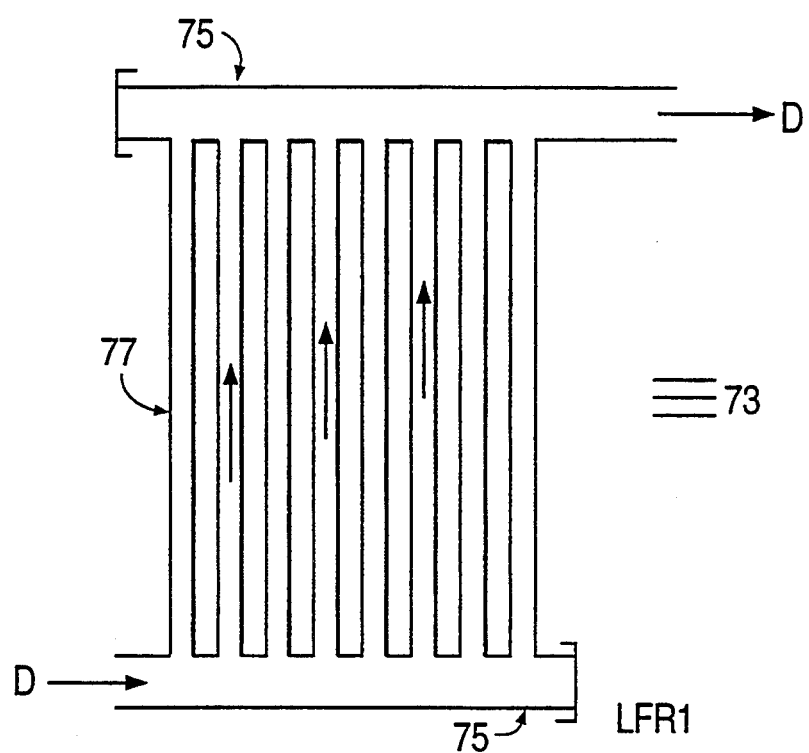
FIG. 12 is a schematic side cross-sectional view of a first embodiment of exposing means adapted to maintain laminar fluid flow, similar to the turbulent embodiment of FIG. 2 but without baffles, showing a plurality of risers connected in parallel between two headers, with the direction of fluid flow indicated by "D"

Embodiments of exposing means in which the fluid flow is maintained in a laminar state throughout substantially the entire fluid flow path are also within the scope of the invention. FIG. 12 shows a first laminar flow embodiment. Exposing means 73 includes headers 75 and risers 77 similarly to the first turbulent flow embodiment shown in FIG. 1, with the exception that no baffles are disposed within headers 75. The headers 75 and risers 77 are comprised of materials as with the embodiment shown in FIG. 2. Headers 75 are sized to maintain laminar flow at flow rates below a design maximum. Similarly, the number and dimensions of risers 77 are selected to maintain laminar flow. The direction of fluid flow is again denoted by "D".

Figure 14:
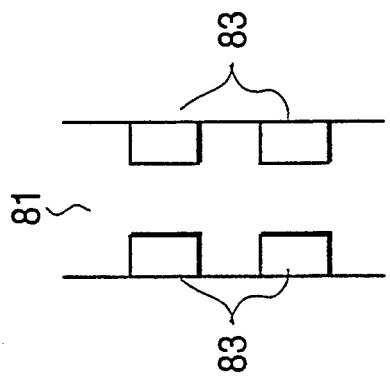
FIG. 14 is a schematic cross-sectional view of the header in FIG. 13 along the section C—C, showing the screens surrounding the openings of the risers.
Figure 15:
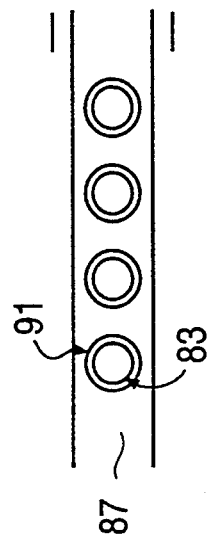
FIG. 15 is a schematic cross-sectional view of a header in FIG. 13 showing the orientation of openings on either side of the header.
Figure 13:
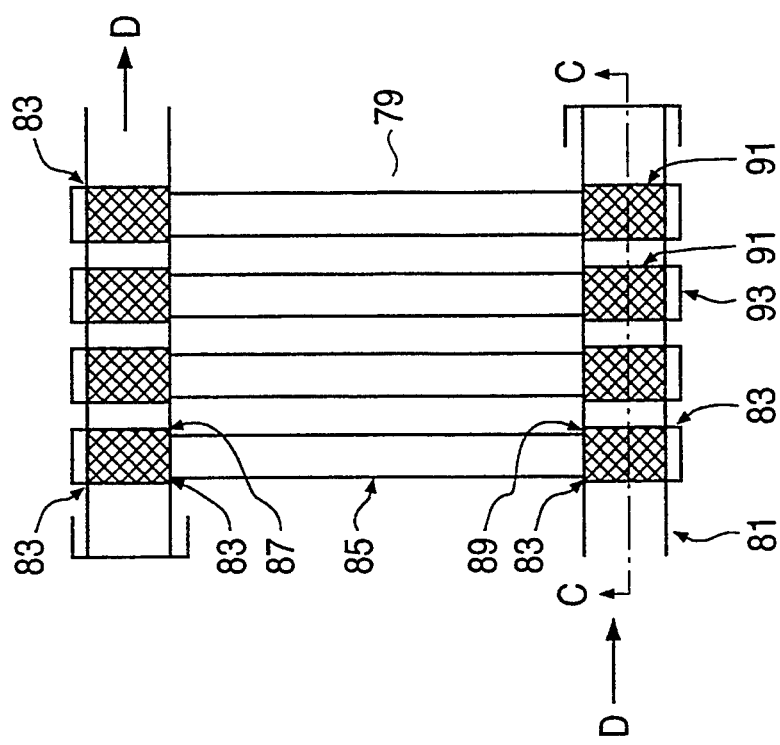
FIG. 13 is a schematic side cross-sectional view of a second embodiment of exposing means adapted for laminar flow application, similar to that of FIG. 12, showing the disposition of a plurality of screens within the headers.

FIGS. 13–15 show a second laminar flow embodiment, suitable for use as a packed-bed photocatalytic reactor. In exposing means 79, headers 81 have defined therethrough a plurality of openings 83. These openings are arranged in pairs on opposite surfaces of each header 81, as shown in FIG. 14. An equal number of pairs of openings 83 are present in each header 81. Risers 85 having first ends 87 and second ends 89 connect the headers 81, joining the headers 81 at openings 83 on the facing surfaces of the headers 81, as further shown in FIG. 15.

Disposed within each of the headers 81 are screens 91. One screen 91 is disposed at each end of each riser 85 within the headers 81. Each screen 91 encloses both the opening 83 to which its associated riser connects with the header, and the opening 83 located on the opposite side of the header, as shown in FIGS. 13 and 15. Finally, an end cap 93 is disposed over each opening 83 on the headers 81 opposite the openings 83 to which the risers 85 connect, sealing these openings 83.

The screens 91, installed as shown, allow the introduction into risers 85 of a granular material having a coating which includes a photocatalyst, through openings 83 upon removal of end caps 93. The introduced granular material, the coating layer of which preferably includes a photocatalyst such as $TiO_2$, fills the risers 85, but is prevented from intruding into the headers 81 by the screens 91. The end caps 93, when sealed over their associated openings 83, prevent fluid loss from the headers 81 and loss of the granular material from the risers 85.

The headers 81 and risers 85 are comprised of materials as described for the embodiment shown in FIG. 2. The screens 91 are comprised of a chemically inert material, preferably the same material of which the headers 81 are comprised.

In operation, the fluid to be treated flows in the direction "D" through the first header 81, through screens 91 and into risers 85, wherein the fluid is exposed to ultraviolet light in the presence of the granular catalyst material present within risers 85. The treated fluid then flows into the second header 81 and out of the exposing means 79 to be discharged through fluid outlet means 25 (not shown).

A third laminar embodiment is shown in FIGS. 16–17. Exposing means 95 is structurally similar to exposing means 79 of FIG. 13, with the addition of a plurality of conduits 97, one conduit 97 being disposed substantially coaxially within each of risers 85. The conduits 97 are comprised of an ultraviolet-transmitting material similarly to, and preferably the same as, that of which the risers 85 are comprised. End caps 99 are similar to end caps 93 of the embodiment shown in FIG. 13, but are perforated to allow for the passage of conduits 97 therethrough while sealing between themselves, the risers 85 and the headers 81 to prevent fluid or granular material escape or granular material intrusion, as in the preceding embodiment.

This embodiment allows for the insertion into the conduits of means 101 for introducing ultraviolet radiation into the risers 85, similarly to the second turbulent flow embodiment described above in FIG. 3. Thus, ultraviolet illumination of the fluid, and the granular material if present, from internal as well as external sources is facilitated.

A fourth laminar embodiment is shown in FIGS. 18–20. Exposing means 103 is similar to the third turbulent embodiment shown in FIG. 9, having first element 105 and second element 107, except that the second element 107 includes a substantially flat section and surrounding wall sections and can be joined with the first section 105 to define an enclosed volume. This enclosed volume is without internal dividers which cause changes in the direction of fluid flow. In this embodiment, the fluid flow path occupies the entire volume between first element 105 and second element 107, and is sized to afford laminar flow at a flow rate lower than a design maximum. The enclosed volume is preferably filled partially or completely with a granular photocatalytic material of the type previously discussed.

Inlet and outlet nipples 109 and 111 formed integrally with the second element are covered by screens 113, which serve to prevent loss of the granular material. Removable frame 115 facilitates repeated assembly and disassembly of first element. 105 and second element 107 and the addition and. removal of a granular photocatalytic material from. between elements 105 and 107.

The foregoing embodiments can be used in an outdoor environment in which sunlight provides the requisite ultraviolet radiation. The second turbulent flow embodiment shown in FIG. 3 and the third laminar flow embodiment shown in FIG. 16 are also designed to accommodate dual sources of ultraviolet radiation, namely an external source, typically the sun, and an internal source, typically a fluorescent tube. All embodiments can be run continuously if supplied with a continuous (i.e., artificial) source of ultraviolet light. An artificial source of ultraviolet light is particularly advantageous for use during night hours or under daytime weather conditions which do not afford adequate ultraviolet illumination. In embodiments in which the artificial source of ultraviolet light is not disposed internally, it is desirable to provide the ultraviolet light source with protection from weathering or impact from foreign objects. For example, the light source can be enclosed in a separate, ultraviolet-transmitting protective unit.

The invention has been described with reference to certain exemplary embodiments which are not to be construed as limiting the invention in any way. Many changes and modifications within the scope of the present invention may be made without departing from the spirit thereof, and the invention includes all such modifications.

What is claimed is:

1. A solar collector apparatus for the photoexposure of a fluid to sunlight comprising:
   (a) inlet means for supplying fluid to said apparatus;
   (b) means for supplying a photocatalyst to said fluid;
   (c) exposing means for exposing said fluid to ultraviolet light from the sun externally, said ultraviolet light having a wavelength between about 295 nm and 420 nm and having an intensity of less than about 70 W/m$^2$ at an irradiated surface or surfaces, said exposing means comprising at least one channel defining a fluid flow path connected to said inlet means, wherein said channel is comprised completely of an ultraviolet-transmitting, chemically inert material which is self-supporting, said material having an ultraviolet transmittance of at least 80%, an impact strength of at least 0.2, as measured by the test set forth in ASTM D-256 and a flexural modulus of 200,000 to 600,000 psi wherein said exposing means further comprises
       (i) a plurality of units, each of said plurality of units comprising at least two headers, at least one header connected to said fluid inlet means and at least one header connected to a fluid outlet means;
       (ii) each of said plurality of units further comprising a plurality of risers disposed in parallel between and fluidly connecting said at least two headers; and
       (iii) a plurality of means for changing the direction of fluid flow through the exposing means, said plurality of means (i) being disposed within said at least two headers in a staggered relationship, (ii) serving to change to direction of fluid flow through said exposing means, and (iii) ensuring that fluid does not accumulate within said exposing means and cause damage in the event the fluid freezes; and
   (d) said fluid outlet means being connected to said exposing means, said fluid outlet means discharging said fluid from said apparatus.

2. An apparatus as claimed in claim 1, wherein said means for changing the direction of fluid flow comprises a plurality of baffles disposed in a staggered relationship within said plurality of headers.

3. An apparatus as claimed in claim 2, wherein said plurality of baffles have a small hole defined therethrough.

4. An apparatus as claimed in claim 1, wherein said material has an ultraviolet transmittance of at least about 90%.

5. An apparatus as claimed in claim 1, wherein said ultraviolet-transmitting material has an ultraviolet transmittance of about 80%, an impact strength of about 1.1 and a flexural modulus of about 270,000.

6. An apparatus as claimed in claim 1, wherein said ultraviolet transmitting material has an ultraviolet transmittance of about 85%, an impact strength of about 0.6 and a flexural modulus of about 350,000.

7. An apparatus as claimed in claim 1, wherein said ultraviolet transmitting material has an ultraviolet transmittance of about 90%, an impact strength of about 0.23 and a flexural modulus of about 450,000.

8. An apparatus as claimed in claim 1, wherein said ultraviolet-transmitting material has an ultraviolet transmittance of about 90%, an impact strength of about 0.23 and a flexural modulus of about 450,000.

9. An apparatus as claimed in claim 1, wherein said ultraviolet-transmitting material is an impact-modified acrylic material.

10. A method for the photocatalytic treatment of a fluid comprising the steps of:
   (a) supplying fluid to an apparatus for the photocatalytic treatment of a fluid, said apparatus having inlet means, exposing means and outlet means;
   (b) supplying a photocatalyst to said fluid;
   (c) externally exposing said fluid to ultraviolet light directly from the sun, said ultraviolet light having a wavelength of about 295 to about 420 nm and having an intensity of less than about 70 W/m$^2$ by flowing said fluid through a component of said apparatus comprising at least one channel defining a fluid flow path connected to said inlet and outlet means, wherein said channel is comprised completely of an ultraviolet-transmitting, chemically inert material, is self-supporting, said material having an ultraviolet transmittance of at least 80%, an impact strength of at least 0.2, as measured by the test set forth in ASTM D-256 and a flexural modulus of 200,000 to 600,000 psi, and (d) discharging said fluid from said apparatus through said outlet means, wherein said exposing means comprises (i) a plurality of units, each of said plurality of units comprising at least two headers, at least one header connected to said fluid inlet means and at least one header connected to said fluid outlet means;

(ii) each of said plurality of units further comprising a plurality of risers disposed in parallel between and fluidly connecting said at least two headers; and (iii) a plurality of means for changing the direction of fluid flow through the exposing means, said plurality of means (i) being disposed within said at least two headers in a staggered relationship, (ii) serving to change the direction of fluid flow through said exposing means, and (iii) ensuring that fluid does not accumulate within said exposing means and cause damage in the event the fluid freezes;

said headers, risers and baffles being arranged such that given the fluid mass transport rate, the flow of said fluid along substantially the entire said fluid flow path is turbulent.

11. A method as claimed in claim 10, further comprising the steps of:

pretreating the fluid stream prior to step (a) by removing dirt, foreign objects, metals or metal particles; and posttreating the fluid after step (d) by adjusting the pH of said fluid.

12. A method as claimed in claim 10, wherein said means for changing the direction of fluid flow comprises a plurality of baffles disposed in a staggered relationship within said plurality of headers.

13. An method as claimed in claim 12, wherein said plurality of baffles have a small hole defined therethrough.

14. A method as claimed in claim 10, wherein said fluid is maintained in a state of turbulent flow throughout substantially the entire said fluid flow path.

15. A method as claimed in claim 14, wherein said photocatalyst is a powdered catalyst.

* * * * *